United States Patent
Hirose et al.

(10) Patent No.: US 6,342,549 B1
(45) Date of Patent: Jan. 29, 2002

(54) CYCLOOLEFIN RESIN PELLETS AND A PROCESS FOR PRODUCING A MOLDED PRODUCT THEREOF

(75) Inventors: Toshiyuki Hirose; Yohzoh Yamamoto; Toshio Kimura; Shinji Osato, all of Yamaguchi (JP)

(73) Assignees: Mitsui Chemicals, Inc., Tokyo (JP); Ticona GmbH, Kersterbach (DE)

( * ) Notice: Subject to any disclaimer, the term of this patent is extended or adjusted under 35 U.S.C. 154(b) by 1486 days.

(21) Appl. No.: 08/583,461

(22) Filed: Jan. 5, 1996

Related U.S. Application Data

(63) Continuation of application No. 08/285,140, filed on Aug. 3, 1994, now abandoned.

(30) Foreign Application Priority Data

Aug. 6, 1993 (JP) .............................................. 5-196475

(51) Int. Cl.[7] ................................................. C08K 5/13
(52) U.S. Cl. ....................... 524/120; 524/153; 524/291; 524/302
(58) Field of Search ................................. 523/205, 207; 524/291, 120, 153, 302; 526/282, 283

(56) References Cited

U.S. PATENT DOCUMENTS

| | | | | |
|---|---|---|---|---|
| 3,640,761 A | * | 2/1972 | Hamanaka et al. .......... | 524/351 |
| 3,880,803 A | * | 4/1975 | Keizer ........................ | 524/351 |
| 4,399,265 A | * | 8/1983 | Garware et al. ......... | 528/308.2 |
| 4,614,778 A | | 9/1986 | Kajiura et al. | |
| 4,874,808 A | * | 10/1989 | Minami et al. ............. | 524/291 |
| 5,045,579 A | | 9/1991 | Sugerman .................... | 524/128 |
| 5,109,043 A | * | 4/1992 | Bohshar et al. ............. | 524/126 |
| 5,179,171 A | | 1/1993 | Minami et al. | |
| 5,180,767 A | * | 1/1993 | Sakai et al. ................. | 524/411 |
| 5,298,551 A | * | 3/1994 | Yamamoto ................... | 524/423 |
| 5,334,644 A | * | 8/1994 | Gose et al. ................. | 523/207 |
| 5,846,656 A | * | 12/1998 | Dunski ....................... | 428/402 |
| 6,033,600 A | * | 3/2000 | Henkins et al. ........ | 252/400.24 |
| 6,056,898 A | * | 5/2000 | Semen ................... | 252/400.24 |

FOREIGN PATENT DOCUMENTS

| | | | |
|---|---|---|---|
| EP | 0411628 | | 2/1991 |
| EP | 0423346 | | 4/1991 |
| GB | 1480125 | * | 7/1977 |

OTHER PUBLICATIONS

Patent Abstract of Japan, JP-A-62-252406, Nov. 4, 1987, Mitsui Petrochemical Industries, Ltd.
Patent Abstract of Japan, JP-A-62-252407, Nov. 4, 1987, Mitsui Petrochemical Industries, Ltd.
Patent Abstract of Japan, JP-A-61-11591, Jun. 3, 1986, Mitsui Petrochemical Industries, Ltd.
Patent Abstract of Japan, JP-A-61-120816, Jun. 7, 1986, Mitsui Petrochemical Industries, Ltd.
Patent Abstract of Japan, JP-A-61-98780, May 17, 1986, Mitsui Petrochemical Industries, Ltd.

* cited by examiner

*Primary Examiner*—Veronica P. Hoke

(57) ABSTRACT

Cycloolefin resin pellets of the present invention comprises a cycloolefin resin pellet and a powdery coating material and/or a liquid coating material, the melting point or the glass transition point of the coating material being 200° C. or lower, and the coating material being adhered onto the surface of the cycloolefin resin pellets, so that the molded product thereof is excellent in transparency.

20 Claims, No Drawings

US 6,342,549 B1

CYCLOOLEFIN RESIN PELLETS AND A PROCESS FOR PRODUCING A MOLDED PRODUCT THEREOF

This application is a continuation of application Ser. No. 08/285.140, filed Aug. 3, 1994 now abandoned.

FIELD OF THE INVENTION

The present invention relates to cycloolefin resin pellets comprising cycloolefin resin pellets and a coating material adhered onto the surface of the pellets, and a process for producing a molded product thereof. More particularly, the present invention relates to cycloolefin resin pellets making it possible to reduce the amount of impurities, such as gelatinous contaminants and burns, which are adversely affected to the transparency of a molded product when producing by melting the pellets of a cycloolefin random copolymer of ethylene and a specific cycloolefin, a ring-opening (co)polymer of the specific cycloolefin and a hydrogenation product of the ring-opening (co)polymer; and a process for producing a molded product thereof.

BACKGROUND OF THE INVENTION

The present inventors have proposed a variety of cycloolefin random copolymers of ethylene and a specific cycloolefin, as described in, for example, Japanese Patent Laid-Open Publication No. 168708/1985 and specifications of Japanese Patent Applications No. 220550/1984, No. 236828/1984, No. 236829/1984 and No. 242336/1984. The cycloolefin random copolymers described in those specifications have excellent transparency and are excellent in various properties such as heat resistance, thermal aging resistance, chemical resistance, solvent resistance, dielectric properties and mechanical properties. Further, such cycloolefin random copolymers have good adhesion to substrates of various materials. Accordingly, the cycloolefin random copolymers can be used, for example, in a field of optical materials such as optical memory discs and optical fibers, and a field of transparent container materials and packaging materials such as transparent films and transparent containers. Moreover, since the ring-opening (co)polymer of the above-described cycloolefin and the hydrogenation product thereof have similar properties to the cycloolefin random copolymer, these have been used for the same application field.

In general, such cycloolefin resins are pelletized immediately after the copolymerization, and the resultant pellets are melted to form a molded product, such as films, sheets and injection molded products.

However, when a variety of molded products are formed from these cycloolefin resin pellets, the transparency is sometimes reduced due to the production conditions.

The present inventors have studied about the reason for undesirably reducing the transparency, and as a result, they have found that the reduction of the transparency is caused by impurities, such as gelatinous contaminants and burns, generated in the cycloolefin resin.

That is, since the cycloolefin resin pellets can be prepared immediately after producing a resin under the conditions such that an excess shear stress is not applied to the resin, the amount of gelatinous contaminants contained therein are very small, as described hereinafter. However, it has been found that the gelatinous contaminants in the molded product formed from such pellets are liable to markedly increase as compared to the pellets used as a starting material, causing to the reduction of the transparency.

For reducing the amount of the impurities generated in the molded product, an antioxidant and the like are generally incorporated into the polymer. However, even if such antioxidants are incorporated as a stabilizer, the amount of the impurities in the molded product can be reduced only to a limited amount.

OBJECT OF THE INVENTION

Accordingly, an object of the present invention is to provide cycloolefin resin pellets capable of producing a molded product having excellent transparency, and a process for producing a molded product thereof.

SUMMARY OF THE INVENTION

The cycloolefin resin pellets of the present invention comprises a cycloolefin resin pellet and a powdery coating material and/or a liquid coating material, the melting point or the glass transition point of said coating material being 200° C. or lower, the coating material being adhered onto the surface of the pellet comprising at least one cycloolefin resin selecting from:

(A) a cycloolefin random copolymer of:
   (a) ethylene and
   (b) a cycloolefin represented by the following formula (I) or (II) and having a softening temperature (TMA) of 70° C. or higher;

(B) a ring-opening (copolymer of a cycloolefin represented by the following formula (I) or (II) and having a softening temperature (TMA) of 70° C. or higher; and (C) a hydrogenation product of the ring-opening. (co) polymer (B) and having a softening temperature (TMA) of 70° C. or higher;

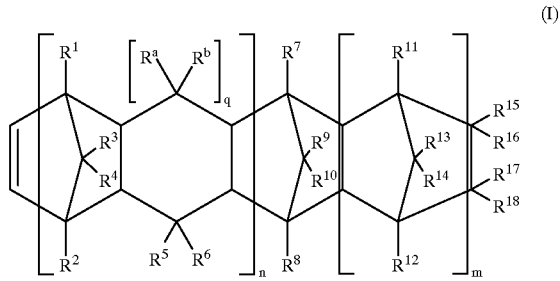

wherein n is 0 or 1; m is 0 or a positive integer; q is 0 or 1;

$R^1$ to $R^{18}$, and $R^a$ and $R^b$ are each independently a hydrogen atom, a halogen atom and a hydrocarbon group;

$R^{15}$ to $R^{18}$ may be linked with one another to form a monocyclic or polycyclic ring which may have a double bond; and $R^{15}$ and $R^{16}$, or $R^{17}$ and $R^{18}$ may together form an alkylidene group; or

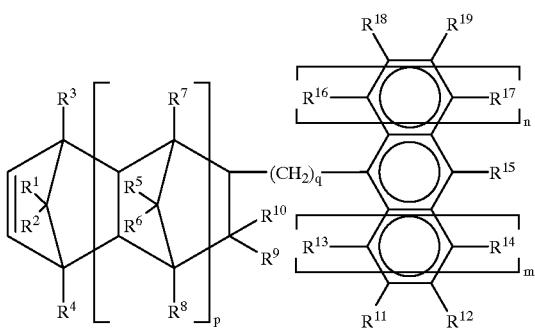

(II)

wherein each of p and q is independently 0 or an integer of 1 or more; each of m and n is independently 0, 1 or 2;

$R^1$ to $R^{19}$ are each independently a hydrogen atom, a halogen atom, an aliphatic hydrocarbon group, an alicyclic hydrocarbon group, an aromatic hydrocarbon group or an alkoxy group; the carbon atom to which $R^9$ and $R^{10}$ are linked may be bonded directly or by way of an alkylene group of 1 to 3 carbon atoms to the carbon atom to which $R^{13}$ is linked or the carbon atom to which $R^{11}$ is linked; and $R^{15}$ and $R^{12}$, or $R^{15}$ and $R^{19}$ may be linked to each other to form a monocyclic or polycyclic aromatic ring when each of m and n is 0.

The process for producing a molded product of the cycloolefin resin pellets of the present invention comprises the steps of:

adhering onto the surface of 100 parts by weight of a cycloolefin resin pellet, 0.01 to 10 parts by weight of a powdery coating material and/or a liquid coating material, the melting point or the glass transition point of the coating material being 200° C. or lower, and melting the resultant pellet to form a molded product, the cycloolefin resin pellet comprising at least one cycloolefin resin selecting from:

(A) a cycloolefin random copolymer of:
(a) ethylene and
(b) a cycloolefin represented by the following formula (I) or (II) and having a softening temperature (TMA) of 70° C. or higher;

(B) a ring-opening (co)polymer of a cycloolefin represented by the following formula (I) or (II) and having a softening temperature (TMA) of 70° C. or higher; and (C) a hydrogenation product of the ring-opening (co) polymer (B) and having a softening temperature (TMA) of 70° C. or higher.

In the present invention, the molded product is usually produced by pelletizing the cycloolefin resin in a powdery state to obtain pellets, adhering a specific powdery coating material and/or a liquid coating material onto the surface of the pellets, and melting the resultant pellets to form a molded product, so that impurities such as gelatinous contaminants or burns are hard to be generated at the time of molding. Therefore, when by the use of the process according to the present invention, optical disc substrates are manufactured, reading errors caused by the impurities in the substrate can be reduced. Further, when a transparent film is formed, a film having an extremely high transparency can be obtained.

DETAILED DESCRIPTION OF THE INVENTION

The cycloolefin resin pellets of the present invention and the process for producing a molded product thereof will be described in detail hereinafter.

The molded product of the cycloolefin resin pellets according to the present invention is produced by adhering a specific powdery coating material and/or a specific liquid coating material onto the surface of a cycloolefin resin pellet, and melting the resultant pellet to form a molded product.

The cycloolefin resin used in the present invention is selected from:

(A) a cycloolefin random copolymer of:
(a) ethylene and
(b) a cycloolefin represented by the following formula I) or (II) and having a softening temperature (TMA) of 70° C. or higher;

(B) a ring-opening (co)polymer of a cycloolefin represented by the following formula (I) or (II) and having a softening temperature (TMA) of 70° C. or higher; and (C) a hydrogenation product of the ring-opening (co) polymer (B) and having a softening temperature (TMA) of 70° C. or higher.

The cycloolefin used in the present invention is represented by the following formula (I) or (II).

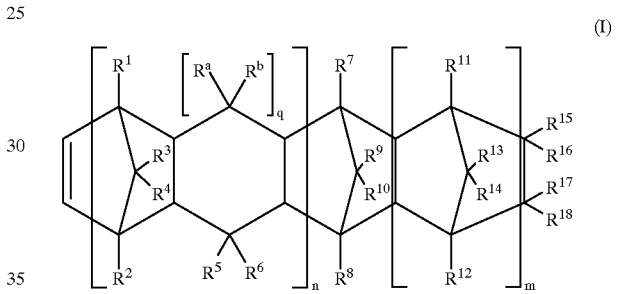

(I)

In formula (I), n is 0 or 1, m is 0 or a positive integer, and q is 0 or 1. When q is 1, a ring represented by using q is a 6-membered ring, and when q is 0, this ring is a 5-membered ring.

Further, $R^1$ to $R^{18}$, and $R^a$ and $R^b$ are each independently a hydrogen atom, a halogen atom or a hydrocarbon group.

Examples of the halogen atom include a fluorine atom, a chlorine atom, a bromine atom and an iodine atom.

Examples of the hydrocarbon group generally include an alkyl group of 1 to 20 carbon atoms, a cycloalkyl group of 3 to 15 carbon atoms or an aromatic hydrocarbon group.

Examples of the alkyl group include methyl, ethyl, propyl, isopropyl, amyl, hexyl, octyl, decyl, dodecyl and octadecyl. These alkyl groups may be substituted with halogen atoms. Examples of the cycloalkyl group include cyclohexyl. Examples of the aromatic hydrocarbon group include phenyl and naphthyl.

Moreover, in formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be linked together (or cooperate with each other) to form a monocyclic or polycyclic group, and the thus formed monocyclic or polycyclic group may have a double bond.

Examples of the monocyclic or polycyclic group are given below.

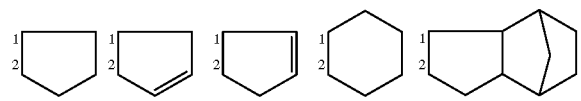

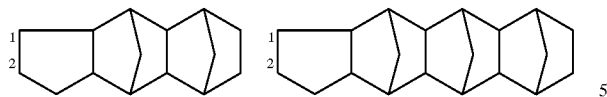

In these cyclic groups, the carbon atoms attached with numerals 1 and 2 are those to which substituent $R^{15}$ ($R^{16}$) or $R^{17}$ ($R^{18}$) is linked.

In formula (I), $R^{15}$ and $R^{16}$, or $R^{17}$ and $R^{18}$ may together form an alkylidene group. This alkylidene group generally has 2 to 20 carbon atoms, and examples of such alkylidene group include ethylidene group, propylidene group and isopropylidene group.

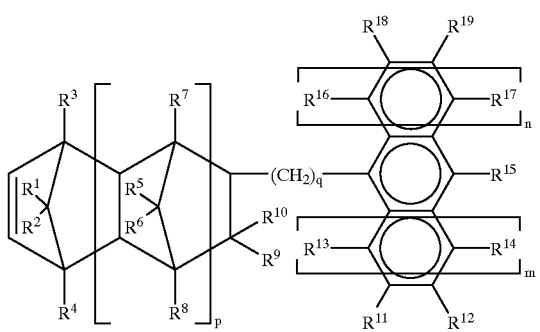

(II)

In formula (II), each of p and q is independently 0 or a positive integer, and each of m and n is independently 0, 1 or 2.

Further, $R'^1$ to $R'^{19}$ are each independently a hydrogen atom, a halogen atom, an aliphatic hydrocarbon group, an alicyclic hydrocarbon group, an aromatic hydrocarbon group or an alkoxy group.

In formula (II), the halogen atom has the same meaning as in formula (I).

The aliphatic hydrocarbon groups include generally an alkyl group of 1 to 20 carbon atoms. Specific examples of the alkyl group include methyl, ethyl, propyl, isopropyl, amyl, hexyl, octyl, decyl, dodecyl and octadecyl. These alkyl groups may by substituted with halogen atoms.

The alicyclic hydrocarbon groups include cycloalkyl group of 3 to 15 carbon atoms. Examples of the cycloalkyl group include cyclohexyl.

The aromatic hydrocarbon group include an aryl group and an aralkyl group. Specific examples include phenyl, tolyl, naphthyl, benzyl and phenylethyl.

The alkoxy group include methoxy, ethoxy and propoxy.

Further, in formula (II), the carbon atom to which $R'^9$ to $R'^{10}$ are linked may be bonded directly or by way of an alkylene group of 1 to 3 carbon atoms to the carbon atom to which $R^{13}$ is linked or the carbon atom to which $R^1$ is linked. That is, when the above two carbon atoms are linked by way of an alkylene group, $R'^9$ and $R'^{13}$, or $R'^{10}$ and $R'^{11}$ together (or cooperate with each other) to form alkylene group, such as methylene ($-CH_2-$), ethylene ($-CH_2CH_2-$) or propylene ($-CH_2CH_2CH_2-$).

Furthermore, in the case of m=n=0, $R'^{15}$ and $R'^{12}$, or $R'^{15}$ and $R'^{12}$ may be linked together to form a monocyclic or polycyclic aromatic ring. Examples of the aromatic ring which is formed from $R'^{15}$ and $R'^{12}$ in the case of m=n=0 are given below.

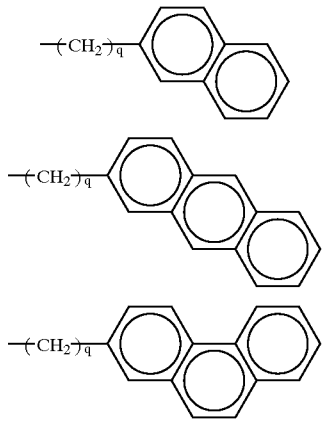

In the above formulas, q is the same as defined in formula (II).

Examples of the cycloolefin represented by the formula (I) or (II) include bicyclo-2-heptene derivatives (bicyclohept-2-ene derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-3-hexadecene derivatives, pentacyclo-4-hexadecene derivatives, hexacyclo-4-heptadecene derivatives, heptacyclo-5-eicosene derivatives, heptacyclo-4-eicosene derivatives, heptacyclo-5-heneicosene derivatives, octacyclo-5-docosene derivatives, nonacyclo-5-pentacosene derivatives, nonacyclo-6-hexacosene derivatives, cyclopentadiene-acenaphthylene adducts, 1,4-methano-1,4,4a,9a-tetrahydrofluorene derivatives and 1,4-methano-1,4,4a,5,10,10a-hexahydroanthracene derivatives.

Examples of the cycloolefin represented by the formula (I) or (II) are as follows.

The bicyclo[2.2.1]hept-2-ene derivatives such as

Bicyclo[2.2.1]hept-2-ene

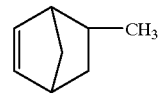

6-Methylbicyclo[2.2.1]hept-2-ene

-continued

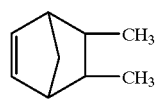

5,6-Dimethylbicyclo[2.2.1]-hept-2-ene

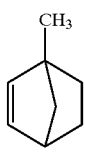

1-Methylbicyclo[2.2.1]hept-2-ene

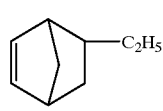

6-Ethylbicyclo[2.2.1]hept-2-ene

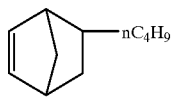

6-n-Butylbicyclo[2.2.1]hept-2-ene

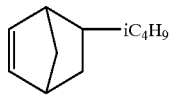

6-Isobutylbicyclo[2.2.1]hept-2-ene

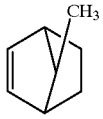

7-Methylbicyclo[2.2.1]hept-2-ene;

the tricyclo[4.3.0.1$^{2,5}$]-3-decene derivatives such as

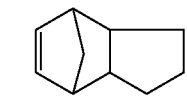

Tricyclo[4.3.0.1$^{2,5}$]-3-decene,

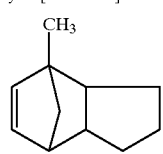

2-Methyltricyclo[4.3.0.1$^{2,5}$]-3-decene

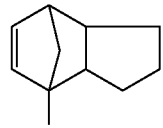

5-Methyltricyclo[4.3.0.1$^{2,5}$]-3-decene;

the tricyclo[4.4.0.1$^{2,5}$]-3-undecene derivatives such as

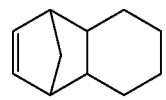

Tricyclo[4.4.0.1$^{2,5}$]-3-undecene

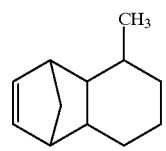

10-Methyltricyclo[4.4.0.1$^{2,5}$]-3-undecene;

the tetracyclo[4.4.0.1$^{2,5}$.1$^{7,10}$]-3-dodecene derivatives such as

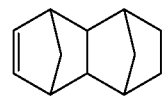

Tetracyclo[4.4.0.1$^{2,5}$.1$^{7,10}$]-3-dodecene,

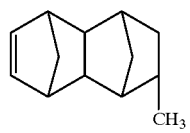

8-Methyltetracyclo[4.4.0.1$^{2,5}$.1$^{7,10}$]-3-dodecene

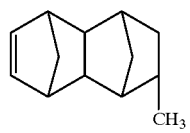

8-Ethyltetracyclo[4.4.0.1$^{2,5}$.1$^{7,10}$]-3-dodecene

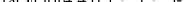

8-Propyltetracyclo[4.4.0.1$^{2,5}$.1$^{7,10}$]-3-dodecene

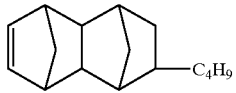

8-Butyltetracyclo[4.4.0.1$^{2,5}$.1$^{7,10}$]-3-dodecene

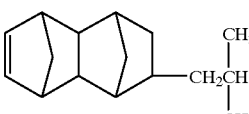

8-Isobutyltetracyclo[4.4.0.1$^{2,5}$.1$^{7,10}$]-3-dodecene

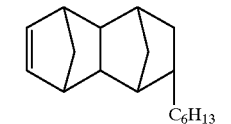

8-Hexyltetracyclo[4.4.0.1$^{2,5}$.1$^{7,10}$]-3-dodecene

-continued

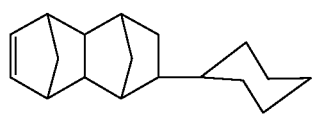

8-Cyclohexyltetracyclo-[4.4.0.1$^{2,5}$.1$^{7,10}$]-3-dodecene

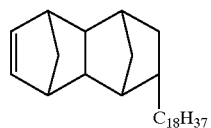

8-Stearyltetracyclo-[4.4.0.1$^{2,5}$.1$^{7,10}$]-3-dodecene

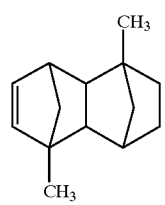

5,10-Dimethyltetracyclo-[4.4.0.1$^{2,5}$.1$^{7,10}$]-3-dodecene

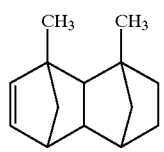

2,10-Dimethyltetracyclo-[4.4.0.1$^{2,5}$.1$^{7,10}$]-3-dodecene

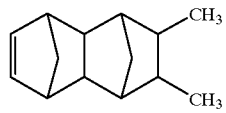

8,9-Dimethyltetracyclo-[4.4.0.1$^{2,5}$.1$^{7,10}$]-3-dodecene

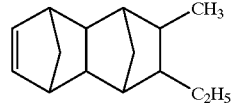

8-Ethyl-9-methyltetracyclo-
[4.4.0.1$^{2,5}$.1$^{7,10}$]-3-dodecene

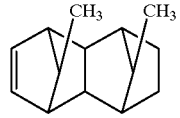

11,12-Dimethyltetracyclo-[4.4.0.1$^{2,5}$.1$^{7,10}$]-3-dodecene

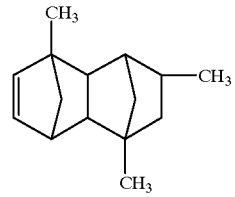

2,7,9-Trimethyltetracyclo-[4.4.0.1$^{2,5}$.1$^{7,10}$]-3-dodecene

-continued

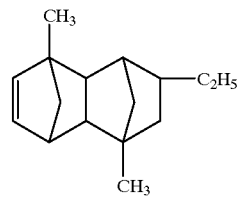

2,7-Dimthyl-9-
ethyltetracyclo-
[4.4.0.1$^{2,5}$.1$^{7,10}$]-3-dodecene

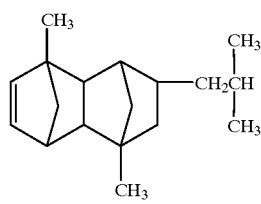

9-Isobutyl-2,7-dimethyltetracyclo-
[4.4.0.1$^{2,5}$.1$^{7,10}$]-3-dodecene

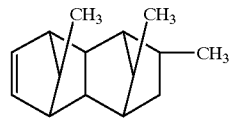

9,11,12-Trimethyltetracyclo-[4.4.0.1$^{2,5}$.1$^{7,10}$]-3-dodecene

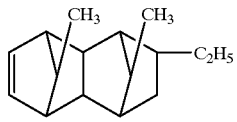

9-Ethyl-11,12-methyltetracyclo-[4.4.0.1$^{2,5}$.1$^{7,10}$]-3-dodecene

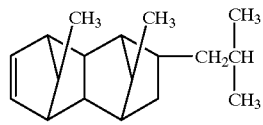

9-Isobutyl-11,12-dimethyltetracyclo-[4.4.0.1$^{2,5}$.1$^{7,10}$]-3-dodecene

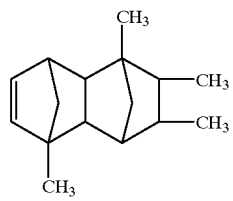

5,8,9,10-Tetramethyltetracyclo-[4.4.0.1$^{2,5}$.1$^{7,10}$]-3-dodecene

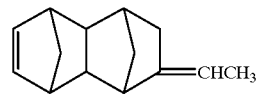

8-Ethylidenetetracyclo-[4.4.0.1$^{2,5}$.1$^{7,10}$]-3-dodecene

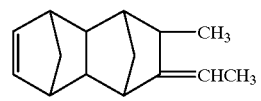

8-Ethylidene-9-methyltetracyclo-[4.4.0.1$^{2,5}$.1$^{7,10}$]-3-dodecene

-continued

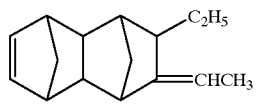

8-Ethylidene-9-butyltetracyclo-[4.4.0.1$^{2,5}$.1$^{7,10}$]-3-dodecene

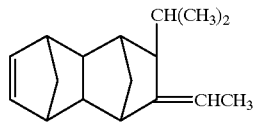

8-Ethylidene-9-isopropyltetracyclo-[4.4.0.1$^{2,5}$.1$^{7,10}$]-3-dodecene

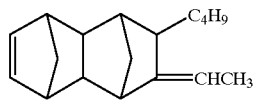

8-Ethylidene-9-butyltetracyclo-[4.4.0.1$^{2,5}$.1$^{7,10}$]-3-dodecene

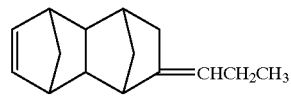

8-n-Propylidenetetracyclo-[4.4.0.1$^{2,5}$.1$^{7,10}$]-3-dodecene

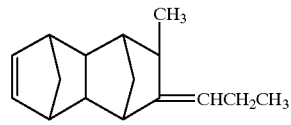

8-n-Propylidene-9-methyltetracyclo-[4.4.0.1$^{2,5}$.1$^{7,10}$]-3-dodecene

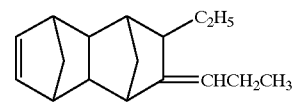

8-n-Propylidene-9-ethyltetracyclo-[4.4.0.1$^{2,5}$.1$^{7,10}$]-3-dodecene

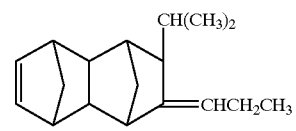

8-n-Propylidene-9-isopropyltetracyclo-[4.4.0.1$^{2,5}$.1$^{7,10}$]-3-dodecene

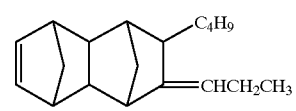

8-n-Propylidene-9-butyltetracyclo-[4.4.0.1$^{2,5}$.1$^{7,10}$]-3-dodecene

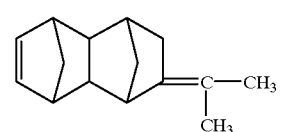

8-Isopropylidenetetracyclo-[4.4.0.1$^{2,5}$.1$^{7,10}$]-3-dodecene

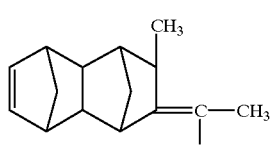

8-Isopropylidene-9-methyltetracyclo-[4.4.0.1$^{2,5}$.1$^{7,10}$]-3-dodecene

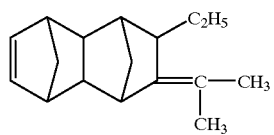

8-Isopropylidene-9-ethyltetracyclo-[4.4.0.1$^{2,5}$.1$^{7,10}$]-3-dodecene

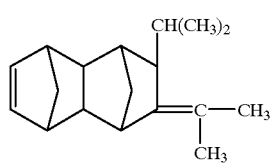

8-Isopropylidene-9-isopropyltetracyclo-[4.4.0.1$^{2,5}$.1$^{7,10}$]-3-dodecene

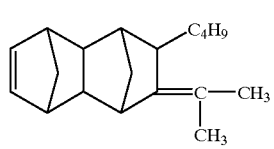

8-Isopropylidene-9-butyltetracyclo-[4.4.0.1$^{2,5}$.1$^{7,10}$]-3-dodecene;

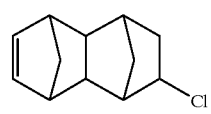

8-Chlorotetracyclo[4.4.0.1$^{2,5}$.1$^{7,10}$]-3-dodecene

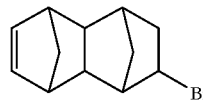

8-Bromotetracyclo[4.4.0.1$^{2,5}$.1$^{7,10}$]-3-dodecene

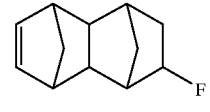

8-Fluorotetracyclo[4.4.0.1$^{2,5}$.1$^{7,10}$]-3-dodecene

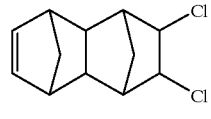

8,9-Dichlorotetracyclo[4.4.0.1$^{2,5}$.1$^{7,10}$]-3-dodecene the pentacyclo[6.5.1.1$^{3,6}$.0$^{2,7}$.0$^{9,13}$]-4-pentadecene derivatives such as

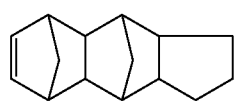

Pentacyclo[6.5.1.1$^{3,6}$.0$^{2,7}$.0$^{9,13}$]-4-pentadecene

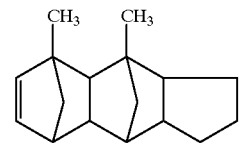

1,3-Dimethylpentacyclo-[6.5.1.1$^{3,6}$.0$^{2,7}$.0$^{9,13}$]-4-pentadecene

-continued

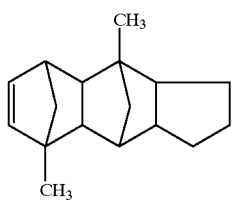

1,6-Dimethylpentacyclo-
[6.5.1.1$^{3,6}$.0$^{2,7}$.0$^{9,13}$]-4-
pentadecene

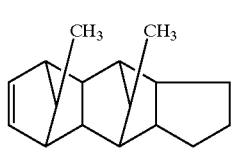

14,15-Dimethylpentacyclo
[6.5.1.1$^{3,6}$.0$^{2,7}$.0$^{9,13}$]-4-
pentadecene;

the pentacyclo[7.4.0.1$^{2,5}$.1$^{9,12}$.0$^{8,13}$]-3-pentadecene derivatives such as

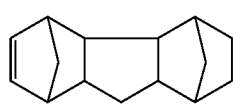

Pentacyclo
[7.4.0.1$^{2,5}$.1$^{9,12}$.0$^{8,13}$]-3-
pentadecene

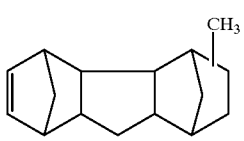

Methyl-substituted
pentacyclo
[7.4.0.1$^{2,5}$.1$^{9,12}$.0$^{8,13}$]-3-
pentadecene;

the pentacyclopentadecadiene compounds such as

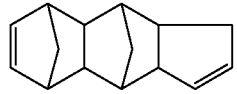

Pentacyclo[6.5.1.1$^{3,6}$.0$^{2,7}$.
0$^{9,13}$]-4,10-pentadecadiene;

the pentacyclo[8.4.0.1$^{2,5}$.1$^{9,12}$.0$^{8,13}$]-3-hexadecene derivatives such as

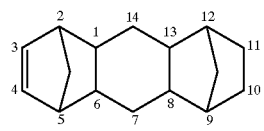

Pentacyclo[8.4.0.1$^{2,5}$.
1$^{9,12}$.0$^{8,13}$]-3-hexadecene

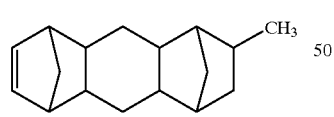

11-Methylpentacyclo
[8.4.0.1$^{2,5}$.1$^{9,12}$.0$^{8,13}$]-3-
hexadecene

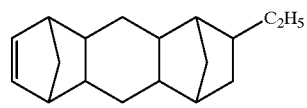

11-Ethylpentacyclo
[8.4.0.1$^{2,5}$.1$^{9,12}$.0$^{8,13}$]-3-
hexadecene

-continued

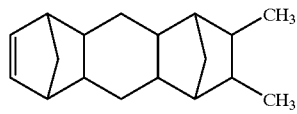

10,11-Dimethylpentacyclo
[8.4.0.1$^{2,5}$.1$^{9,12}$.0$^{8,13}$]-3-
hexadecene;

the pentacyclo[6.6.1.1$^{3,6}$.0$^{2,7}$.0$^{9,14}$]-4-hexadecene derivatives such as

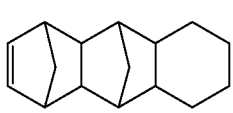

Pentacyclo
[6.6.1.1$^{3,6}$.0$^{2,7}$.0$^{9,14}$]-4-
hexadecene

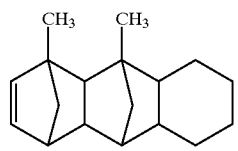

1,3-Dimethylpentacyclo-
[6.6.1.1$^{3,6}$.0$^{2,7}$.0$^{9,14}$]-4-
hexadecene

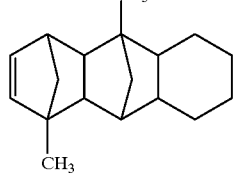

1,6-Dimethylpentacyclo-
[6.6.1.1$^{3,6}$.0$^{2,7}$.0$^{9,14}$]-4-
hexadecene

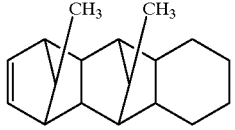

15,16-Dimethylpentacyclo-
[6.6.1.1$^{3,6}$.0$^{2,7}$.0$^{9,14}$]-4-
hexadecene;

the hexacyclo[6.6.1.1$^{3,6}$.1$^{10,13}$.0$^{2,7}$.0$^{9,14}$]-4-heptadecene derivatives such as

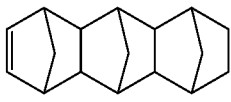

Hexacyclo
[6.6.1.1$^{3,6}$.1$^{10,13}$.0$^{2,7}$.0$^{9,14}$]
-4-heptadecene

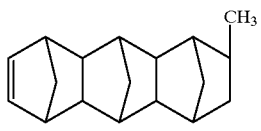

12-Methylhexacyclo
[6.6.1.1$^{3,6}$.1$^{10,13}$.0$^{2,7}$.0$^{9,14}$]
-4-heptadecene

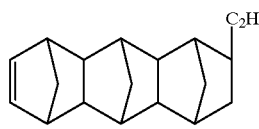

12-Ethylhexacyclo
[6.6.1.1$^{3,6}$.1$^{10,13}$.0$^{2,7}$.0$^{9,14}$]
-4-heptadecene

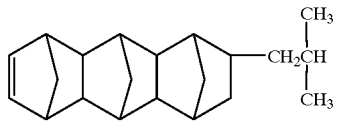

12-Isobutylhexacyclo
[6.6.1.1$^{3,6}$.1$^{10,13}$.0$^{2,7}$.0$^{9,14}$]
-4-heptadecene

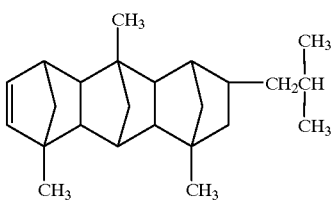

1,6,10-Trimethyl-12-
isobutylhexacyclo
[6.6.1.1$^{3,6}$.1$^{10,13}$.0$^{2,7}$.0$^{9,14}$]
-4-heptadecene;

the heptacyclo-5-eicosene derivatives such as

Heptacyclo[8.7.0.1$^{2,9}$.1$^{4,7}$.
1$^{11,17}$.0$^{3,8}$.0$^{12,16}$]-5-
eicosene;

the heptacyclo[8.7.0.1$^{3,6}$.1$^{10,17}$.1$^{12,15}$.0$^{2,7}$.0$^{11,16}$]-4-eicosene derivatives such as

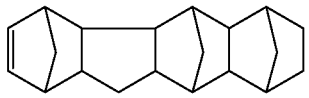

Heptacyclo[8.7.0.1$^{3,6}$.1$^{10,17}$.
1$^{12,15}$.0$^{2,7}$.0$^{11,16}$]-4-eicosene

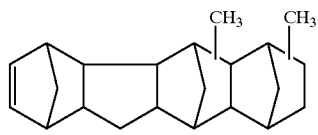

Dilmethyl-substituted
heptacyclo-
[8.7.0.1$^{3,6}$.1$^{10,17}$.1$^{12,15}$.
0$^{2,7}$.0$^{11,16}$]-4-eicosene;

the heptacyclo-5-heneicosene derivatives such as

Heptacyclo[8.8.0.1$^{2,9}$.1$^{4,7}$.
1$^{11,18}$.0$^{3,8}$.0$^{12,17}$]-5-
heneicosene

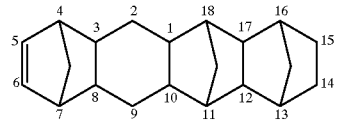

Heptacyclo
[8.8.0.1$^{4,7}$.1$^{11,18}$.
1$^{13,16}$.0$^{3,8}$.0$^{12,17}$]-5-
heneicosene

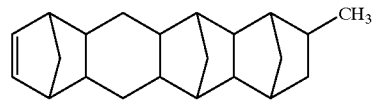

15-Methylheptacyclo
[8.8.0.1$^{4,7}$.1$^{11,18}$.1$^{13,16}$.
0$^{3,8}$.0$^{12,17}$]-5-heneicosene

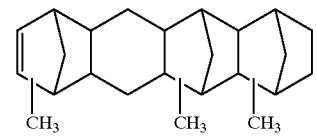

Trimethyl-substituted-
heptacyclo
[8.8.0.1$^{4,7}$.1$^{11,18}$.
1$^{13,16}$.0$^{3,8}$.0$^{12,17}$]-5-
heneicosene;

the octacyclo[8.8.0.1$^{2,9}$.1$^{4,7}$.1$^{11,18}$.1$^{13,16}$.0$^{3,8}$.0$^{12,17}$]-5-docosene derivatives such as

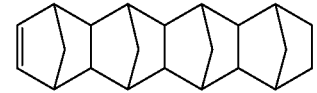

Octacyclo
[8.8.0.1$^{2,9}$.1$^{4,7}$.1$^{11,18}$.1$^{13,16}$.
0$^{3,8}$.0$^{12,17}$]-5-docosene

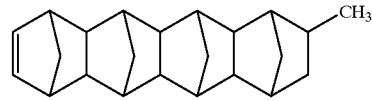

15-Methyloctacyclo
[8.8.0.1$^{2,9}$.1$^{4,7}$.1$^{11,18}$.
1$^{13,16}$.0$^{3,8}$.0$^{12,17}$]-5-docosene

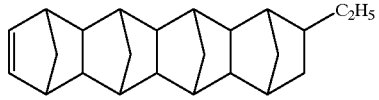

15-Ethyloctacyclo
[8.8.0.1$^{2,9}$.1$^{4,7}$.1$^{11,18}$.
1$^{13,16}$.0$^{3,8}$.0$^{12,17}$]-5-
docosene;

the nonacyclo[10.9.1.1$^{4,7}$.1$^{13,20}$.1$^{15,18}$.0$^{2,10}$.0$^{3,8}$. 0$^{12,21}$.0$^{14,19}$]-5-pentacosene derivatives such as

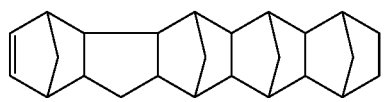

Nonacyclo[10.9.1.1$^{4,7}$.1$^{13,20}$.
1$^{15,18}$.0$^{2,10}$.0$^{3,8}$.0$^{12,21}$.
0$^{14,19}$]-5-pentacosene

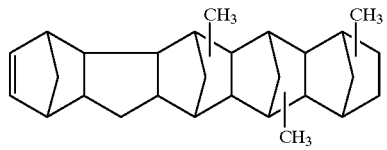

Trimethyl-substituted-
nonacyclo-[10.9.1.1$^{4,7}$.1$^{13,20}$.
1$^{15,18}$.0$^{2,10}$.0$^{3,8}$.0$^{12,21}$.
0$^{14,19}$]-5-pentacosene the nonacyclo[10.10.1.1$^{5,8}$.1$^{14,21}$.1$^{16,19}$.0$^{2,11}$.0$^{4,9}$. 0$^{13,22}$.0$^{15,20}$]-6-hexacosene derivatives such as

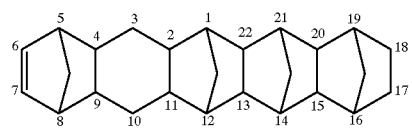

Nonacyclo[10.10.1.1$^{5,8}$.1$^{14,21}$
1$^{16,19}$.0$^{2,11}$.0$^{4,9}$.0$^{13,22}$.
0$^{15,20}$]-6-hexacosene and furthermore,

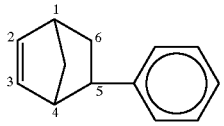

5-Phenyl-bicyclo[2.2.1]hept-2-ene

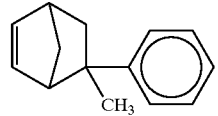

5-Methyl-5-phenyl-bicyclo[2.2.1]-hept-2-ene

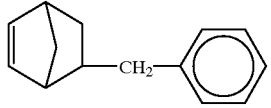

5-Benzyl-bicyclo[2.2.1]hept-2-ene

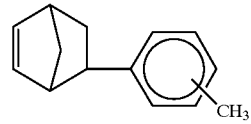

5-Tolyl-bicyclo[2.2.1]hept-2-ene

-continued

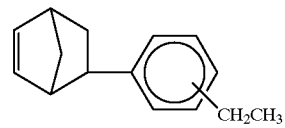

5-(Ethylphenyl)-bicyclo[2.2.1]hept-2-ene

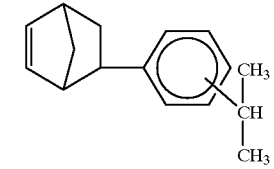

5-(Isopropylphenyl)-bicyclo[2.2.1]-hept-2-ene

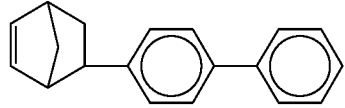

5-(Biphenyl)-bicyclo[2.2.1]hept-2-ene

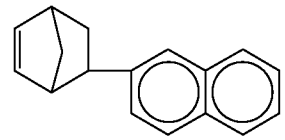

5-(β-Naphthyl)-bicyclo[2.2.1]hept-2-ene

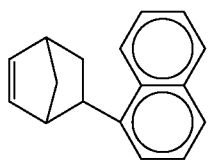

5-(α-Naphthyl)-bicyclo[2.2.1]hept-2-ene

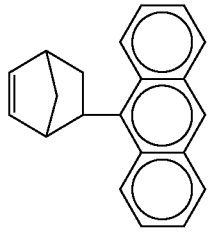

5-(Anthracenyl)-bicyclo[2.2.1]hept-2-ene

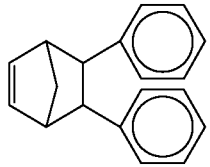

5,6-Diphenyl-bicyclo[2.2.1]hept-2-ene

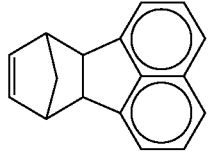

Cyclopentadiene-
acenaphthylene adducts

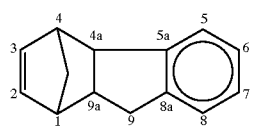

1,4-Methano-1,4,4a,9a-
tetrahydro-fluorene

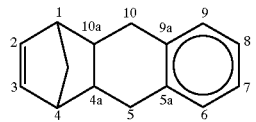

1,4-Methano-1,4,4a,5,10,10a-
hexahydroanthracene

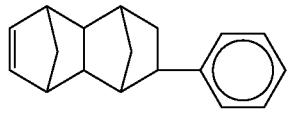

8-Phenyltetracyclo
[4.4.0.1$^{2,5}$.1$^{7,10}$]-3-dodecene

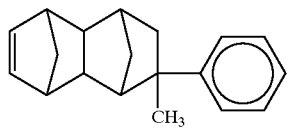

8-Methyl-8-phenyl-tetracyclo
[4.4.0.1$^{2,5}$.1$^{7,10}$]-3-dodecene

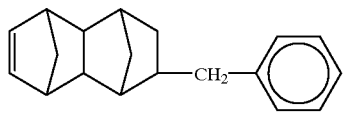

8-Benzyl-tetracyclo
[4.4.0.1$^{2,5}$.1$^{7,10}$]-3-dodecene

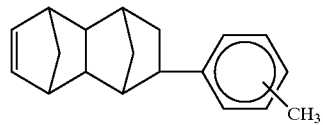

8-Tolyl-tetracyclo
[4.4.0.1$^{2,5}$.1$^{7,10}$]-3-dodecene

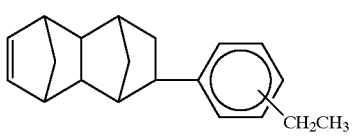

8-(Ethylphenyl)-tetracyclo
[4.4.0.1$^{2,5}$.1$^{7,10}$]-3-dodecene

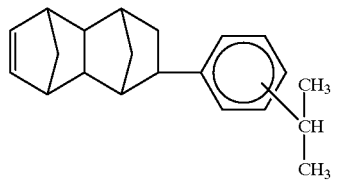

8-(Isopropylphenyl)tetracyclo
[4.4.0.1$^{2,5}$.1$^{7,10}$]-3-dodecene

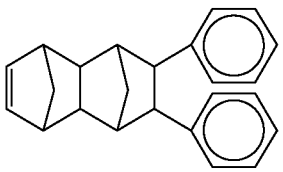

8,9-Diphenyl-tetracyclo
[4.4.0.1$^{2,5}$.1$^{7,10}$]-3-dodecene

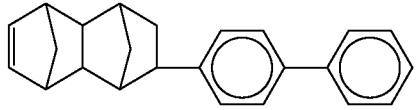

8-(Biphenyl)-tetracyclo
[4.4.0.1$^{2,5}$.1$^{7,10}$]-3-dodecene

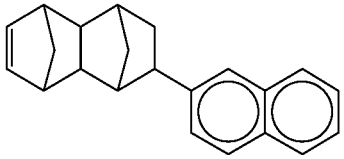

8-(β-Naphthyl)-tetracyclo
[4.4.0.1$^{2,5}$.1$^{7,10}$]-3-dodecene

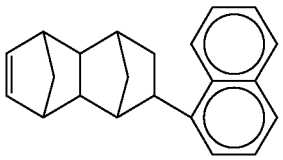

8-(α-Naphthyl)-tetracyclo
[4.4.0.1$^{2,5}$.1$^{7,10}$]-3-dodecene

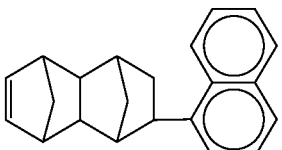

8-(Anthracenyl)-tetracyclo
[4.4.0.1$^{2,5}$.1$^{7,10}$]-3-dodecene

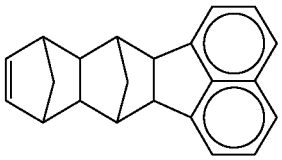

Compound of cyclopentadiene-
acenaphthylene adducts with
cyclopentadiene further
added

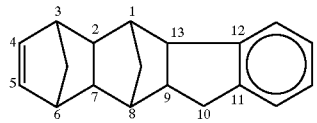

11,12-Benzo-pentacyclo
[6.5.1.1$^{3,6}$.0$^{2,7}$.0$^{9,13}$]-
4-pentadecene

-continued

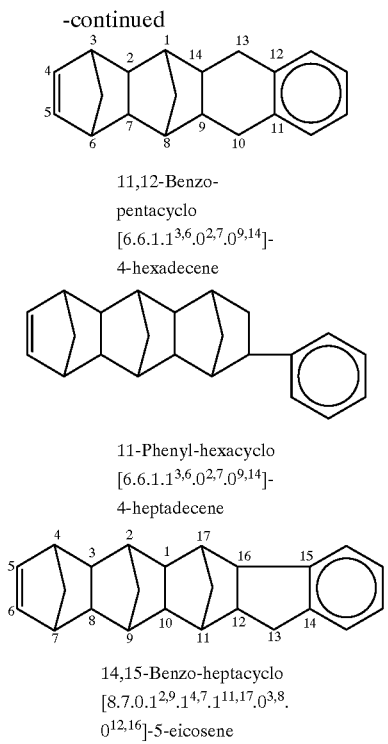

11,12-Benzo-
pentacyclo
[6.6.1.1³,⁶.0²,⁷.0⁹,¹⁴]-
4-hexadecene

11-Phenyl-hexacyclo
[6.6.1.1³,⁶.0²,⁷.0⁹,¹⁴]-
4-heptadecene 14,15-Benzo-heptacyclo
[8.7.0.1²,⁹.1⁴,⁷.1¹¹,¹⁷.0³,⁸.
0¹²,¹⁶]-5-eicosene The cycloolefin random copolymer (A) is comprised of recurring units derived from ethylene and the above-mentioned cycloolefins.

However, the cycloolefin random copolymer (A) may contain recurring units derived from other monomers copolymerizable with the ethylene (a) and the cycloolefin (b), with the proviso that the properties of the resulting copolymer are not marred.

Examples of the other monomers than the ethylene and the cycloolefin include:

α-olefins of 3 to 20 carbon atoms, such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene;

cycloolefins, such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene;

norbornenes, such as 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene; and non-conjugated dienes, such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene.

These monomers can be used alone or in combination.

In the cycloolefin random copolymer (A), the recurring units derived from such monomers as described above are contained in an amount of usually 20 mol % or less, preferably 10 mol % or less.

In the cycloolefin random copolymer (A), the cycloolefin represented by the formula (I) or (II) is presumed to form recurring units represented by the following formula (III) or (IV).

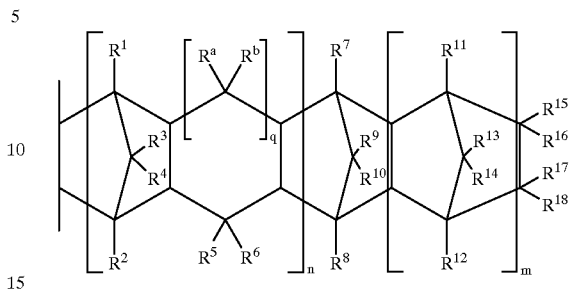
(III)

wherein m, n, q, $R^1$ to $R^{18}$, $R^a$ and $R^b$ have the same meanings as defined in formula (I).

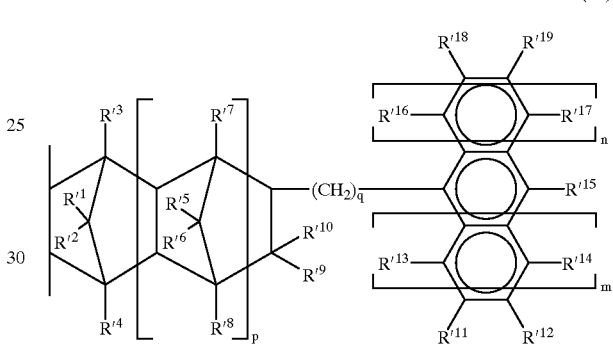
(IV)

wherein m, n, p, q and $R'^1$ to $R'^{19}$ have the same meanings as defined in formula (TI).

In the cycloolefin random copolymer (A), recurring units derived from the ethylene (a) are contained in the range of usually 40 to 90 mol %, preferably 50 to 85 mol %, and recurring units derived from the cycloolefin (b) are contained in the range of usually 10 to 60 mol %, preferably 15 to 50 mol %. The recurring units derived from ethylene (a) and those derived from the cycloolefins (b) are arranged at random and substantially linearly.

The cycloolefin random copolymer (A) can be prepared by polymerizing the ethylene (a) and the cycloolefin (b) in, for example, a hydrocarbon medium or a cycloolefin which is liquid at a reaction temperature among the above-mentioned cycloolefins in the presence of a catalyst (i) formed from a hydrocarbon-soluble vanadium compound and a halogen-containing organoaluminum compound, or a catalyst (ii) formed from a transition metal compound of Group IV or a lanthanoid having a cyclopentadienyl skeleton and an organoaluminum oxy-compound, and if necessary, an organoaluminum compound.

Processes for preparing cycloolefin random copolymers have been already applied for patent, and the above-mentioned copolymer can be prepared under the appropriately selected conditions in accordance with the processes proposed by the present applicant as described in, for example, Japanese Patent Laid-Open Publications No. 168708/1985, No. 120816/1986, No. 115912/1986, No. 115916/1986, No. 271308/1986, No. 272216/1986, No. 252406/1987 and No. 252407/1987, and specifications of Japanese Patent Applications No. 95905/1986 and No. 95906/1986.

More specifically, for example, in a continuous polymerization apparatus, ethylene is polymerized with tetracyclo

[4.4.0.1$^{2,5}$.1$^{7,10}$]-3-dodecene (hereinafter sometimes referred to as "TCD-3") as the cycloolefin in a cyclohexane medium using VO(OCH$_2$CH$_3$)Cl$_2$/Al(CH$_2$CH$_3$)$_{1.5}$Cl$_{1.5}$ as a catalyst under the conditions of a reaction temperature of 10° C. and a reaction time (retention time for polymerization reaction) of 30 minutes, to prepare an ethylene/TCD-3 random copolymer.

The ring-opening (co)polymer (B) can be obtained by ring-opening (co)polymerizing the cycloolefin represented by formula (I) or (II).

In the ring-opening (co)polymer, at least a part of the cycloolefin represented by formula (I) or (II) is presumed to form recurring units represented by the following formula (V) or (VI):

(V)

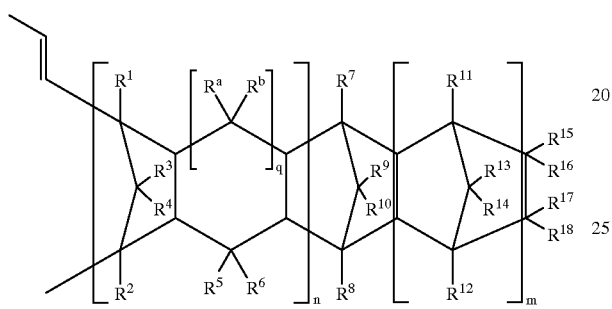

wherein m, n, q, R$^1$ to R$^{18}$, R$^a$ and R$^b$ have the same meanings as defined in formula (I), or (VI)

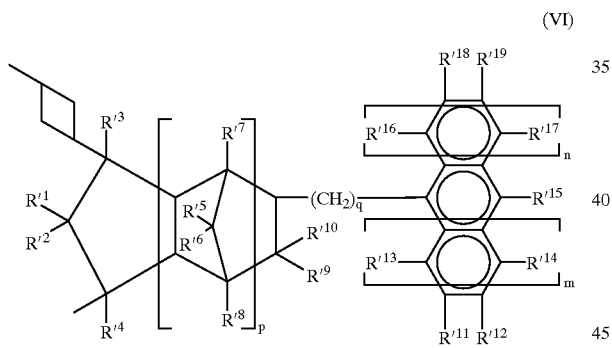

wherein m, n, p, q and R"$^1$ to R'$^{19}$ have the same meanings as defined in formula (II)

The ring-opening (co)polymer can be prepared by the methods as disclosed in the above Japanese Patent Laid-Open Publications, namely, it can be prepared by ring-opening (co)polymerizing the cycloolefin represented by formula (I) or (II) in the presence of a ring-opening polymerization catalyst.

Examples of the ring-opening polymerization catalyst used in the present invention include:

a catalyst comprising a halogenated compound, nitrate or an acetylacetone compound with a metal(s), such as ruthenium, rhodium, palladium, osmium, indium or platinum, and a reducing agent, or a catalyst comprising a halogenated compound or an acetylacetone compound with a metal(s) such as titanium, palladium, zirconium or molybdenum, and an organoaluminum compound.

The hydrogenation product (C) can be prepared by hydrogenating the above-mentioned ring-opening (co)polymer (B) in the presence of the known hydrogenation catalyst.

In the hydrogenation product (C), at least a part of the cycloolefin represented by the formula (I) or (II) is presumed to form recurring units represented by the following formula (VII) or (VIII):

(VII)

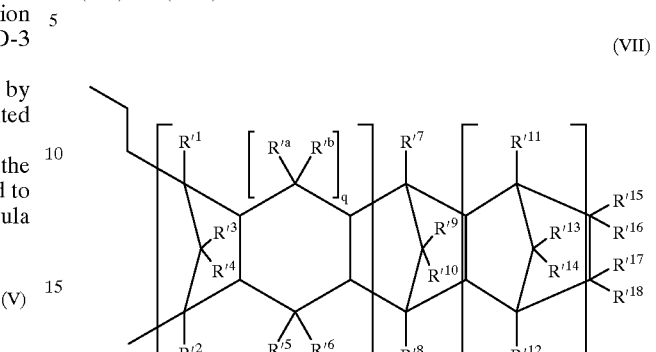

wherein m, n, q, and R'$^1$ to R'$^{18}$, R'$^a$ and R'$^b$ have the same meanings as defined in formula (I), or (VIII)

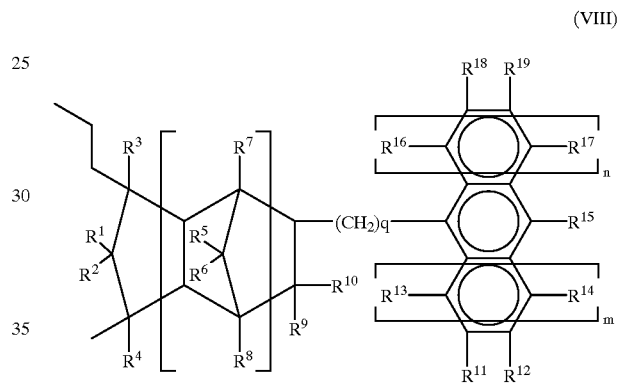

wherein m, n, p, q, and R$^1$ to R$^{19}$ have the same meaning as defined in formula (II).

Examples of such polymers include ring-opening (co) polymers of tetracyclododecene, norbornene and derivatives thereof, and hydrogenation products of these copolymers.

The above-mentioned cycloolefin random copolymer (A), ring (co)polymers (B) and hydrogenation products (C) (hereinafter sometimes named generically "cycloolefin resin") may be partially modified with unsaturated carboxylic acid such as maleic anhydride. Such modified products can be produced by reacting the cycloolefin resin with an unsaturated carboxylic acid, anhydride thereof, or derivatives thereof such as alkyl ester of unsaturated carboxylic acid.

The modification ratio of the modified product of the cycloolefin resin is usually 50 mol % or less, preferably 10 mol % or less.

The cycloolefin resin modified product can be prepared by adding a modifier to the cycloolefin resin and graft polymerizing the resin so as to obtain the desired modification ratio.

For example, the graft polymerization may be conducted by melting the cycloolefin resin and adding a modifier thereto, or by dissolving the cycloolefin resin and the modifier in a solvent. In the graft polymerization, a radical initiator is preferably used, and the reaction temperature is usually in the range of 60 to 350° C.

Such cycloolefin resin modified product can be prepared by adding a modifier in an amount such that a given modification ratio can be obtained to the cycloolefin resin to effect a graft polymerization, or by initially preparing a modified product of high modification ratio and mixing the modified product with an unmodified cycloolefin resin.

The intrinsic viscosity [η] of the cycloolefin resin, as measured in decalin at 135° C., is in the range of usually 0.01 to 5 dl/g, preferably 0.1 to 3 dl/g, more preferably 0.2 to 2.5 dl/g.

The glass transition temperature (Tg) of the cycloolefin resin is in the range of usually 60 to 230° C., preferably 70 to 190° C.

The crystallinity of the cycloolefin resin, as measured by X-ray diffractometry, is in the range of usually 0 to 10%, preferably 0 to 7%, particularly preferably 0 to 5%.

The softening temperature (TMA) of the cycloolefin resin is 70° C. or higher, preferably 70 to 250° C., more preferably 80 to 200° C., most preferably 90 to 180° C.

In the present invention, the softening temperature (TMA) is determined by heat distortion behavior of a sample in the form of a sheet having a thickness of 1 mm using Thermo Mechanical Analyzer (produced by Du Pont). In detail, a quartz needle was put on the sheet, and the sheet is heated at a heating rate of 5° C./min under a load of 49 g. The temperature at which the needle entered into the sheet by 0.635 mm is taken as the softening temperature (TMA).

The cycloolefin random copolymer (A), the ring-opening (co)polymer (B), the hydrogenation products (C), and the modified products of these can be used alone or in combination.

Other than the above-mentioned cycloolefin resin, a cycloolefin resin having a softening temperature (TMA) of lower than 70° C. may be used in combination, with the proviso that the thus mixed cycloolefin resin (composition) is required to have a softening temperature (TMA) of 70° C. or higher.

The above-mentioned cycloolefin resin is usually obtained in the form of a powder or a concentrated solution. To the thus obtained cycloolefin resin may be appropriately blended antioxidants, stabilizers and fillers and the like, and thereafter, the resultant mixture is pelletized by, for example, a pelletizer.

In the pelletization of the cycloolefin resin, the cycloolefin resin is pelletized in such a manner that an excess shear stress is not applied thereto, preferably, the cycloolefin resin pellets are prepared by removing the cyclohexane-insoluble cycloolefin resin fine particles having a particle diameter of 1 μm or more (hereinafter sometimes referred to as "cyclohexane-insoluble fine particles") by filtration through a polymer filter provided on the outlet side of the extruder. In more detail, the cycloolefin resin pellets can be prepared by melt extruding a resin powder or a concentrated solution of the resin at a temperature of not lower than the glass transition temperature (Tg) by means of an extruder, allowing the resin to pass through a polymer filter made of metallic nonwoven fabric and cutting the resultant resin with a pelletizer.

The number of the insoluble fine particles in the extruder can be reduced by decreasing the shear stress applied to the resin and removing the produced cyclohexane-insoluble fine particles. For example, the resin powder or the concentrated solution of the resin can be pelletized after preheating to the glass transition temperature (Tg) or thereabout and feeding to the extruder; raising sufficiently the temperature of the vent zone of the extruder; or filtering the copolymer under such conditions that a difference in the pressure (differential pressure) between before and behind the polymer filter is not made excessively large in order to enhance the filter efficiency of the polymer filter.

That is, the pelletization after polymerization is effected under such conditions that an excess shear stress is not applied to the resin, and the cyclohexane-insoluble fine particles produced at the time of polymerization are removed, so that the transparency of the molded product can be enhanced and the haze of the molded product can be reduced.

The cyclohexane-insoluble fine particles are almost not produced at the time of the polymerization. For example, the number of the cyclohexane-insoluble fine particles having a particle diameter of 1 μm or more contained in the cycloolefin random copolymer immediately after the copolymerization is as few as about 600/100 mg. Therefore, it is considered that the cyclohexane-insoluble fine particles are produced when applying an excess shear stress to the resin after the polymerization.

However, when the cycloolefin resin pellets are pelletized by the processes as described above, the number of the cyclohexane-insoluble fine particles having a particle diameter of 1 μm or more contained in 30 mg of the cycloolefin resin pellets can be made 60,000 or less, preferably 50,000 or less, more preferably 30,000 or less.

The number of the cyclohexane-insoluble fine particles having a particle diameter of 1 μm or more is measured as follows.

The cycloolefin resin pellets are dissolved in cyclohexane in an amount of 3 g/liter, in said cyclohexane 200 fine particles or less having a particle diameter of 1 μm or more, as measured by a fine particle counter (KL-01 type, produced by Lyon Co.) using a KS-60 type sensor, being contained per 10 ml of cyclohexane. Then, the number of fine particles having a particle diameter of 1 μm or more contained in 10 ml of the resulting polymer solution is counted by the same fine particle counter.

In the present invention, the specific powdery coating material and/or liquid coating material is adhered onto the surface of the cycloolefin resin pellets, and the resultant pellets are melted to form a desired molded product.

The melting point or the glass transition point of the powdery coating material and/or liquid coating material (hereinafter referred to as "coating material") used in the present invention is 200° C. or lower.

When such a coating material has a melting point or a glass transition point, the melting point or the glass transition point is 200° C. or lower, preferably 200 to −50° C. Further, when such a coating material has both the melting point and glass transition point, the glass transition point is 200° C. or lower, preferably 180 to −50° C.

That is, the coating material used in the present invention is a material capable of maintaining a powdery state or a liquid state both at a temperature when the coating material is adhered onto the pellets and at room temperature.

As the coating material, organic materials having a lubricating action or an antioxidant action may be used.

As the coating materials, for example, there may be used phenolic antioxidant, phosphorus stabilizer, sulfur stabilizer, ultraviolet absorbing agent, fatty acid, fatty acid salt, fatty acid ester of polyhydric alcohol, amide compound, wax, oil and polymeric compound. For example, the phenolic antioxidant, phosphorus stabilizer, sulfur stabilizer and ultraviolet absorbing agent have mainly an antioxidant action to the heat-melted cycloolefin resin, and most of the fatty acid, fatty acid salt, fatty acid ester of polyhydric alcohol, amide compound, wax and oil have a lubricating action. Further, the fatty acid, fatty acid ester of polyhydric alcohol, amide compound, wax, oil and polymeric compound may also be used as a coating material.

The coating materials used in the present invention are given bellow.

Examples of the phenolic antioxidant include:

p-hydroxyanisole, 3-methyl-4-isopropylphenol, ascorbic acid, 2-tert-butyl-4,6-dimethylphenol, 2-tert-butyl-4-methoxyphenol, 2,6-di-tert-butylphenol, propyl gallate, m,p-styrenated cresol, 2-(1-methylcyclohexyl)-4,6-dimethylphenol, 2,4-di-tert-butyl-4-hydroxytoluene, 3,5-di-tert-butyl-4-hydroxytoluene, 2,5-di-tert-butyl-4-hydroxyphenol, 4-hydroxymethyl-2,6-di-tert-butylphnol, 2,4,6-tri-tert-butylphenol, 2,6-di-tert-α-dimethylamino-p-cresol, 1,1-bis(4-hydroxyphenyl)cyclohexane, n-octyl gallate, dodecyl gallate, butylated bisphenol A, 4,4'-methylene-bis(2-tert-butyl-6-methylphenol), 2,2'-methylene-bis(4-methyl-6-tert-butylphenol), 4,4'-thio-bis(2-methyl-6-tert-butylphenol), 4,4'-thio-bis(3-methyl-6-tert-butylphenol), 2,2'-thio-bis(4-methyl-6-tert-butylphenol), 2,2'-methylene-bis(4-ethyl-6-tert-butylphenol), N-stearoyl-p-aminophenol, 4,4'-butylidene-bis(6-tert-butyl-m-cresol), bis(3-methyl-4-hydroxy-5-tert-butylbenzyl)sulfide, 2,2'-methylene-bis(4-methyl-6-cyclohexylphenol), 4,4'-bis(2,6-di-tert-butylphenol), 2,2'-dihydroxy-3,3'-di-α-methylcyclohexyl-5,5'-dimethyldiphenyl methane, 4,4'-methylene-bis-(2,6-di-tert-butylphenol), d,l-α-tocopherol, 2,2'-methylene-bis(6-methylbenzyl-p-cresol), 2,6-bis(2'-hydroxy-3'-tert-butyl-5'-methylbenzyl)4-methylphenol, n-octadecyl-3-(4'-hydroxy-3',5'-di-tert-butylphenyl)propionate, 1,1,3-tris(2-methyl-4-hydroxy-5-tert-butylphenyl)butane, 4,4-butylidene-bis(2-methyl-4-hydroxy-5-tert-butylphenyl)-2-laurylthioether, 6-(4-hydroxy-3,5-di-tert-butylanilino)-2,4-bis(octylthio)-1,3,5-triazine, 2,4-bis(4-hydroxy-3,5-di-tert-butylanilino)-6-(n-octylthio)-1,3,5-triazine, 1,3,5-tris(4-tert-butyl-3-hydroxy-2,6-dimethylbenzyl)-s-triazine-2,4,6 (1H,3H,5H)-trione, tris(3,5-di-tert-butyl-4-hydroxyphenyl)phosphate, 1,3,5-trimethyl-2,4,6-tris(3,5-di-tert-butyl-4-hydroxyphenyl)benzylbenzene, 1,3,5-tris(4-hydroxy-3,5-di-tert-butylbenzyl-s-triazine-2,4,6-(1H,3H,5H)-trione, tris[2-tert-butyl-4-thio(2'-methyl-4'-hydroxy-5'-tert-butylphenyl)5-methylphenyl]phosphite, tetrakis[methylene-3(3,5-di-tert-butyl-4-hydroxyphenyl)propionate]methane and 3,5-di-tert-butyl-4-hydroxybenzylphosphoric acid-distearylester.

Examples of the phosphorus stabilizer include;

tris(2,4-di-tert-butylphenyl)phosphite, tris(mono & di-nonylphenyl)phosphite and tetrakis(2,4-di-tert-butylphenyl)-4,4-biphenylenediphosphonate.

Examples of the sulfur stabilizer include;

dilaurylthiodipropionate, laurylstearylthiodipropionate, distearylthiodipropionate and penta(erythrityl-tetra-β-mercaptolauryl)propionate.

Examples of the ultraviolet absorbing agent include;

2-(2'-hydroxy-3',5'-di-tert-butylphenyl)-5-chlorobenzotriazol, 2,4-di-tert-butylphenyl-3,5-di-tert-butyl-4-hydroxybenzoate, bis(2,2',6,6'-tetramethyl-4-piperidine sebacate and 2,2'-thio-bis(4-tert-octylphenolate)-tert-butylaminonickel(II).

Examples of the fatty acid include oleic acid, stearic acid and palmitic acid.

Examples of the fatty acid salt include zinc stearate, calcium stearate, magnesium stearate, lithium stearate, sodium stearate and calcium 12-hydroxystearate.

Examples of the fatty acid ester of polyhydric alcohol include glycerol monostearate, glycerol distearate, pentaerythritolmonostearate, pentaerythritoldistearate and pentaerythritoltristearate.

Examples of the amide compound include amide compounds of higher fatty acid, such as oleylamide and stearyl amide.

Examples of the wax include synthetic waxes, such as polyethylene wax, polypropylene wax, micro wax, montan wax and carnauba wax, natural wax, the oxidative modified materials of these and the graft modified materials of these.

Examples of polymeric compound include natural or synthetic rosins, such as gum rosin, petroleum resin and hydrogenated petroleum resin; and resin powder, such as polyethylene, polypropylene, polyester and polyamide.

Examples of the oil include natural or synthetic oils, for example, mineral oil such as aromatic oils, naphthene oils and paraffin oils, vegetable oils and silicone oils.

These coating materials may be used alone or in combination.

By the use of the coating material having a lubricity, such as calcium stearate of the fatty acid salt or liquid paraffin oil, the haze of a filmy molded product can be reduced to ½ or lower as compared to that of a molded product using no coating material.

Further, by the use of the coating material having an antioxidant action, the haze of the filmy molded product can be more reduced as compared to the coating material having a lubricity as described above. For example, by the use of the coating material having an antioxidant action, such as tetrakis[methylene-3(3,5-di-tert-butyl-4-hydroxyphenyl)propionate]methane or 3,5-di-tert-butyl-4-hydroxytoluene, the haze of a filmy molded product can be reduced to 1/10 or lower as compared to that of a molded product using no coating material.

Among these coating materials, a material being in the form of powder at ordinary temperature and having an antioxidant action is particularly preferred. Further, a powdery antioxidant having an average particle size of usually 0.1 to 1,000 µm, preferably 50 to 700 µm, is preferred. Among the powdery antioxidants, phenolic antioxidants are more preferred, and the phenolic antioxidants having two or more, preferably three or more, of phenolic hydroxyl group are most preferred. Of these, tetrakis[methylene-3(3,5-di-tert-butyl-4-hydroxyphenyl)propionate]methane is particularly preferred.

The coating material is used usually in an amount of 0.01 to 10 parts by weight, preferably 0.03 to 5 parts by weight, more preferably 0.05 to 3 parts by weight, based on 100 parts by weight of the cycloolefin resin pellets.

The coating material as described above can be adhered onto the surface of the cycloolefin resin pellets by blending the coating material and the cycloolefin resin pellets by means of a mixing equipment, such as a tumbler.

Further, the coating material can be adhered onto the surface of the cycloolefin resin pellets by dissolving the coating material in a volatile solvent, mixing the resultant mixture and the cycloolefin resin pellets, and volatilizing the solvent.

The molded product according to the present invention is produced from the thus prepared cycloolefin resin pellets.

The molded product can be produced under the conditions similar to the usual molding conditions. For example, the molded product can be produced by injection molding; various melt-extrusion moldings, such as film extrusion, sheet extrusion, pipe extrusion, monofilament extrusion and hollow molding; calendering; vacuum forming; and the like.

In these methods, the melt-extrusion molding is effected under the conditions such that the cylinder temperature is set to usually the glass transition temperature (Tg) of the cycloolefin resin +50° C. to Tg+200° C., preferably Tg+70° C. to Tg+170° C., more preferably Tg+100° C. to Tg+150° C.

The thus produced molded product is high in light transmission properties. For example, in the case of the sheet having a thickness of 0.25 mm which does not contain a filler, the light transmission is usually 85% or more. Depending on the kind of the coating material, the light transmission exceeds 90%. Further, the haze of the molded product having a thickness of 0.25 mm is usually 20% or less, mostly 15% or less. When the kind of the coating material is appropriately selected, the haze can be decreased to 5% or less. Moreover, when the most suitable coating material is used, the haze can be decreased to 1% or less.

According to the present invention, since the specific coating material is adhered onto the surface of the cycloolefin resin pellets, impurities such as gelatinous contaminants and burns due to the cyclohexane-insoluble cycloolefin resin fine particles can be reduced when a molded product is produced by melting the pellets, so that a molded product having excellent transparency can be produced.

Accordingly, by the use of the method of the present invention, for example, when an optical disc substrate is produced, reading errors due to poor transparency can be decreased. Further, the transparent film and sheet produced by the method of the present invention are excellent not only in transparency, but also in moisture barrier properties.

Therefore, the molded product according to the present invention is suitable for packaging of drugs, such as PTP package and SP package, and food packaging, such as rice sweets, snacks and cookies. Further, the injection molded product may be used as optical discs, lenses, various transparent containers and syringe barrels; the hollow molded product can be used as containers for drags, such as vials, tablets, eye lotions, cosmetics; and the molded product produced by pipe extrusion can be used as transparent tube, such as pen holders. Moreover, the cycloolefin resin pellets can be molded into a monofilament extruded product which may be used for optical fiber and reinforcing fiber.

According to the present invention, after adhering a specific coating material onto the surface of the cycloolefin resin pellets, a molded product is produced from the resultant pellets. However, when the cycloolefin resin after polymerization is pelletized and a molded product is produced from the resultant pellets, other components such as stabilizers may be blended to the cycloolefin resin in addition to the coating material.

Examples of other components used in the present invention include resin components such as rubber ingredient to enhance the impact strength of the molded product of the cycloolefin resin, heat stabilizer, weathering stabilizer, antistatic agent, slip agent, anti-blocking agent, anti-fogging agent, lubricant, dye, pigment, natural oil, synthetic oil and wax may be added.

Examples of the stabilizer used as an optional ingredient include phenolic antioxidants such as tetrakis[methylene-3(3,5-di-t-butyl-4-hydroxyphenyl)propionate]methane, β-(3,5-di-t-butyl-4-hydroxyphenyl)propionic acid alkyl ester and 2,2'-oxamidobis[ethyl-3(3,5-di-t-butyl-4-hydroxyphenyl)]propionate;

organic phosphite type stabilizers such as trioctylphosphite, trilaurylphosphite, tridecylphosphite, octyl-diphenylphosphite and tris(2,4-di-t-butylphenyl) phosphite;

fatty acid salts such as zinc stearate, calcium stearate and calcium 12-hydroxystearate;

fatty acid esters of polyhydric alcohol include fatty acid esters of glycerol such as glycerol monostearate, glycerol monolaurate, glycerol monomyristate, glycerol monopalmitate, glycerol distearate, glycerol dilaurate; and fatty acid esters of pentaerythritol such as pentaerythritol monostearate, pentaerythritol distearate, pentaerythritol tristearate, pentaerythritol monolaurate and pentaerythritol dilaurate.

These stabilizers may be used alone or in combination. For example, there can be used a combination of tetrakis [methylene-3(3,5-di-t-butyl-4-hydroxyphenyl)propionate] methane, tris(2,4 -di-t-butylphenyl)phosphite, zinc stearate and glycerol monostearate.

In the present invention, the phenolic antioxidant is used in an amount of usually 0 to 10 parts by weight, preferably 0 to 5 parts by weight, more preferably 0 to 2 parts by weight, based on 100 parts by weight of the cycloolefin resin; organic phosphite stabilizer is used in an amount of usually 0 to 10 parts by weight, preferably 0 to 5 parts by weight, more preferably 0 to 2 parts by weight, based on 100 parts by weight of the cycloolefin resin; the metallic salts of fatty acids is used in an amount of usually 0 to 10 parts by weight, preferably 0 to 5 parts by weight, more preferably 0 to 2 parts by weight, based on 100 parts by weight of the cycloolefin resin; and the fatty acid ester of polyhydric alcohol is used in an amount of usually 0 to 10 parts by weight, preferably 0 to 5 parts by weight, based on 100 parts by weight of the cycloolefin resin.

Further, the cycloolefin resin pellets may contain fillers such as silica, diatomaceous earth, alumina, titanium oxide, magnesium oxide, pumice powder, pumice balloon, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flake, glass bead, calcium silicate, montmorillonite, bentonite, graphite, aluminum powder, molybdenum sulfide, boron fiber, silicon carbide fiber, polyethylene fiber, polypropylene fiber, polyester fiber and polyamide fiber, with the proviso that the characteristics of the pellets are not marred.

EFFECT OF THE INVENTION

According to the present invention, the cycloolefin resin pellets are prepared by adhering the specific coating material onto the surface of cycloolefin resin pellets having recurring units derived from a specific cycloolefin, so that when a molded product is produced from the pellets in a molten state, the amount of impurities such as gelatinous contaminants and burns can be reduced. Therefore, according to the present invention, a molded product having excellent transparency can be produced from the cycloolefin resin pellets.

EXAMPLE

The present invention is further described by the following Examples, but the Examples are by no means given to restrict the present invention.

In Examples, the haze and light transmittance of the sheet are determined by the following method.

Haze

The haze was measured in accordance with ASTM D-1003.

Light Transmittance

A transmission at a wavelength of 780 nm of a visible spectrum obtained by measuring a pressed sheet used as a sample with a spectrophotometer MSP-2000 of Shimadzu Seisakusho was taken as a light transmittance.

EXAMPLE 1

To 100 parts by weight of cycloolefin random copolymer pellets (TMA: 88° C., Intrinsic viscosity [η]: 0.68 dl/g, Tg: 70° C. of ethylene and tetracyclo[4,4,0,1$^{2.5}$,1$^{7.10}$]-3-dodecene (TCD-3) preliminarily blended with 0.1 part by weight of tetrakis[methylene-3(3,5-di-tert-butyl-4-hydroxyphenyl)propionate]methane (trade name: Irganox 1010, produced by Nippon Ciba Geigy, Co.) and 0.03 part by weight of calcium stearate as stabilizers, 0.1 part by weight of tetrakis[methylene-3(3,5-di-tert-butyl-4-hydroxyphenyl)propionate]methane (melting point: 118° C.) as a powdery coating material was added and mixed by means of a tumbler, to thereby adhere the coating material onto the surface of the cycloolefin random copolymer pellets.

Then, the resultant pellets were fed to an extruder having a diameter of 30 mm kept at 240° C. to obtain a sheet having a thickness of 0.25 mm by a T-die film molding method.

The light transmittance and haze of the film were determined, and the results are shown in Table 1.

EXAMPLE 2

The same procedure as in Example 1 was repeated except that 0.1 part by weight of a powdery 3,5-di-tert-butyl-4-hydroxytoluene (melting point: 72° C.) was used as a coating material instead of 0.1 part by weight of the tetrakis[methylene-3(3,5-di-tert-butyl-4-hydroxyphenyl)propionate]methane which was adhered onto the surface of the cycloolefin random copolymer pellets, to thereby obtain a sheet.

The light transmittance and haze of the film were determined, and the results are shown in Table 1.

EXAMPLE 3

The same procedure as in Example 1 was repeated except that 0.1 part by weight of a powdery calcium stearate (melting point: 152° C.) was used as a coating material instead of 0.1 part by weight of the tetrakis[methylene-3(3,5-di-tert-butyl-4-hydroxyphenyl)propionate]methane which was adhered onto the surface of the cycloolefin random copolymer pellets, to thereby obtain a sheet.

The light transmittance and haze of the film were determined, and the results are shown in Table 1.

EXAMPLE 4

The same procedure as in Example 1 was repeated except that 0.1 part by weight of a liquid paraffin (glass transition point: −40° C.) was used as a coating material instead of 0.1 part by weight of the tetrakis[methylene-3(3,5-di-tert-butyl-4-hydroxyphenyl)propionate]methane which was adhered onto the surface of the cycloolefin random copolymer pellets, to thereby obtain a sheet.

The light transmittance and haze of the film were determined, and the results are shown in Table 1.

Comparative Example 1

The same procedure as in Example 1 was repeated except that no coating material was used, to thereby obtain a sheet.

The light transmittance and haze of the film were determined, and the results are shown in Table 1.

TABLE 1

| | Coating material | Haze (%) | Light transmittance (%) |
|---|---|---|---|
| Ex. 1 | Tetrakis[methylene-3(3,5-di-tert-butyl-4-hydroxylphenyl propionate]methane | 0.7 | 90 |
| Ex. 2 | 3,5-di-tert-butyl-4-hydroxytoluene | 1.8 | 90 |
| Ex. 3 | Calcium stearate | 13.5 | 89 |
| Ex. 4 | Liquid paraffin | 12.5 | 89 |
| Comp. Ex. 1 | Not used | 34.5 | 89 |

What is claimed is:

1. A process for producing a molded product having excellent transparency and low haze value from cycloolefin resin pellets comprising the steps of:

adhering onto the surface of cycloolefin resin pellet, a powdery coating material and/or a liquid coating material, said coating material being an organic material having a lubricating action or an antioxidant action, the melting point or the glass transition point of said coating material being 200° C. or lower; and melting the resultant pellets to form a molded sheet-like product, such that on the basis of a sheet having a thickness of 0.25 mm the light transmission through the sheet is at least 85% and the haze of the sheet is 20% or less;

said cycloolefin resin pellet comprising at least one cycloolefin resin selected from the group consisting of:

(A) a cycloolefin random copolymer of:
  (a) ethylene and
  (b) a cycloolefin represented by the following formula (I) or (II) and having a softening temperature (TMA) of 70° C. or higher;

(B) a ring-opening (co)polymer of a cycloolefin represented by the following formula (I) or (II) and having a softening temperature (TMA) of 70° C. or higher; and (C) a hydrogenation product of the ring-opening (co)polymer (B) and having a softening temperature (TMA) of 70° C. or higher;

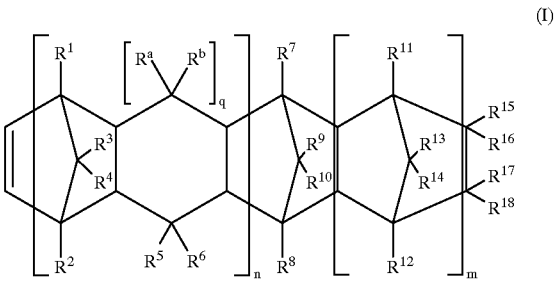

(I)

wherein n is 0 or 1; m is 0 or a positive integer; l is 0 or 1;

R$^1$ to R$^{18}$, and R$^a$ and R$^b$ are each, independently, a hydrogen atom, a halogen atom or a hydrocarbon group;

R$^{15}$ to R$^{18}$ may be linked with one another to form a monocyclic or polycyclic ring which may have a double bond; and R[15] and R[16], or R[17] and R[18] may together form an alkylidene group; or

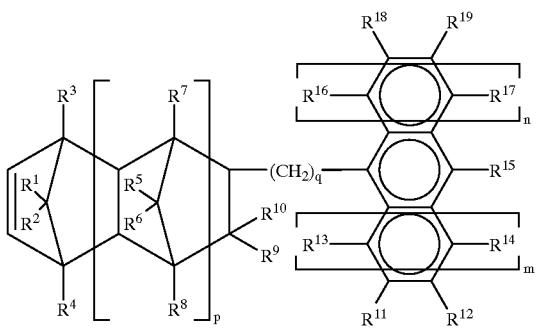

(II)

wherein each of p and q is, independently, 0 or an integer of 1 or more; each of m and n is, independently, 0, 1 or 2;

R'[1] to R'[19] are each, independently, a hydrogen atom, a halogen atom, an aliphatic hydrocarbon group, an alicyclic hydrocarbon group, an aromatic hydrocarbon group or an alkoxy group; the carbon atom to which R'[9] and R'[10] are linked may be bonded directly or by way of an alkylene group of 1 to 3 carbon atoms to the carbon atom to which R'[13] is linked or the carbon atom to which R'[11] is linked; and R'[15] and R'[12], or R'[15] and R'[19] may be linked to each other to form a monocyclic or polycyclic aromatic ring when each of m and n is 0.

2. The process according to claim 1 wherein said powdery or liquid coating material comprises an organic antioxidant.

3. The process according to claim 2 wherein said organic antioxidant is a phenolic antioxidant.

4. The process according to claim 3, wherein said phenolic antioxidant is tetrakis[methylene-3(3,5-di-tert-butyl}-4-hydroxyphenyl)propionate}methane.

5. The process according to claim 1, wherein said coating material is used in an amount of 0.01 to 10 parts by weight, based on 100 parts by weight of the cycloolefin resin pellets.

6. The process according to claim 2 wherein the organic antioxidant coating material is a powdery antioxidant having an average particle size of from 0.1 to 1,000 μm.

7. The process according to claim 2 wherein the organic antioxidant coating material is a powdery antioxidant having an average particle size of from 50 to 700 μm.

8. The process of claim 7 wherein the powdery antioxidant comprises tetrakis[methylene-3(3,5-di-tert-butyl-4-hydroxyphenyl)propionate]methane or 3,5-di-tert-butyl-4-hydroxytoluene.

9. The process of claim 8 wherein the amount of the powdery antioxidant is from about 0.03 to 5 parts by weight, per 100 parts by weight of the cycloolefin resin pellets.

10. The process of claim 2 wherein the amount of the powdery antioxidant is from about 0.03 to 5 parts by weight, per 100 parts by weight of the cycloolefin resin pellets.

11. The process of claim 1 wherein the step of melting the resulting pellet to form a molded product comprises melt-extrusion molding the pellets at a temperature ranging from the glass transition temperature (Tg) of the cycloolefin resin +50° C. to Tg +200° C.

12. The process of claim 1, wherein the step of melting the resultant pellet to form a molded product comprises forming the molded pellets into a sheet such that on the basis of a sheet having a thickness of 0.25 mm the light transmission through the sheet is at least 90% and the haze of the sheet is 15% or less.

13. The process of claim 1 further comprising a step of forming the cycloolefin resin pellet by blending antioxidant with cycloolefin resin and pelletizing the resulting blend to form said cycloolefin resin pellet.

14. A process for producing a molded product having excellent transparency and low haze value from cycloolefin resin pellets comprising the steps of:

adhering onto the surface of cycloolefin resin pellet, a powdery or liquid coating material, wherein the coating material is an organic material selected from the group consisting of phenolic antioxidant, phosphorous stabilizer, sulfur stabilizer, ultraviolet absorbing agent, fatty acid, fatty acid salt, fatty acid ester of polyhydric alcohol, amide compound, wax, oil and polymeric compound, said organic coating material having a lubricating action or an antioxidant action, the melting point or the glass transition point of said coating material being 200° C. or lower; and melting the resultant pellet to form a molded product;

said cycloolefin resin pellet comprising at least one cycloolefin resin selected from the group consisting of:

(A) a cycloolefin random copolymer of:
  (a) ethylene and
  (b) a cycloolefin represented by the following formula (I) or (II) and having a softening temperature (TMA) of 70° C. or higher;

(B) a ring-opening (co)polymer of a cycloolefin represented by the following formula (I) or (II) and having a softening temperature (TMA) of 70° C. or higher; and (C) a hydrogenation product of the ring-opening (co)polymer (B) and having a softening temperature (TMA) of 70° C. or higher;

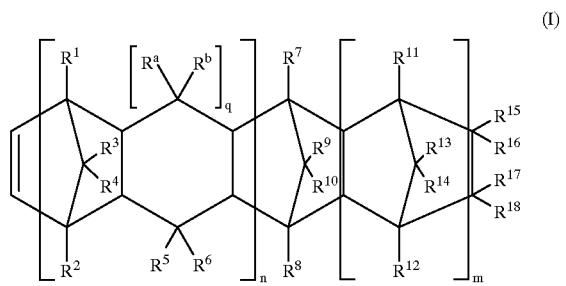

(I)

wherein n is 0 or 1; m is 0 or a positive integer; q is 0 or 1;

R[1] to R[18], and R[a] and R[b] are each independently a hydrogen atom, a halogen atom or a hydrocarbon group;

R[15] to R[18] may be linked with one another to form a monocyclic or polycyclic ring which may have a double bond; and R[15] and R[16], or R[17] and R[18] may together form an alkylidene group; or

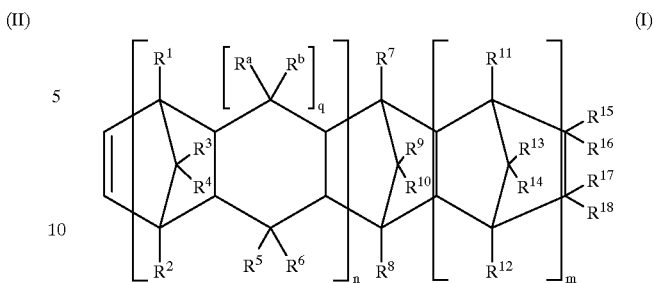

wherein n is 0 or 1; m is 0 or a positive integer; q is 0 or 1;

R$^1$ to R$^{18}$, and R$^a$ and R$^b$ are each, independently, a hydrogen atom, a halogen atom or a hydrocarbon group;

R$^{15}$ to R$^{18}$ may be linked with one another to form a monocyclic or polycyclic ring which may have a double bond; and R$^{15}$ and R$^{16}$, or R$^{17}$ and R$^{18}$ may together form an alkylidene group; or

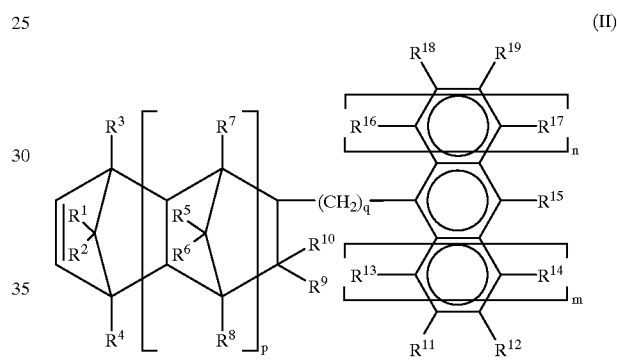

wherein each of p and q is, independently, 0 or an integer of 1 or more; each of m and n is, independently, 0, 1 or 2;

R$^{\prime 1}$ to R$^{\prime 19}$ are each, independently, a hydrogen atom, a halogen atom, an aliphatic hydrocarbon group, an alicyclic hydrocarbon group, an aromatic hydrocarbon group or an alkoxy group; the carbon atom to which R$^{\prime 9}$ and R$^{\prime 10}$ are linked may be bonded directly or by way of an alkylene group of 1 to 3 carbon atoms to the carbon atom to which R$^{\prime 13}$ is linked or the carbon atom to which R$^{\prime 11}$ is linked; and R$^{\prime 15}$ and R$^{\prime 12}$, or R$^{\prime 15}$ and R$^{\prime 19}$ may be linked to each other to form a monocyclic or polycyclic aromatic ring when each of m and n is 0.

16. The process of claim 15 wherein in step (a) forming cycloolefin resin pellets from the resulting blend comprises first removing cyclohexane-insoluble cycloolefin resin fine particles from the cycloolefin resin and then forming the cycloolefin resin pellets.

17. The process of claim 15 wherein step (b) comprises blending the cycloolefin resin pellets with a powdery coating material until the powdery coating material adheres to the surface of the cycloolefin resin pellets.

18. The process of claim 1 wherein step (b) comprises blending the cycloolefin resin pellets with a powdery coating material until the powdery coating material adheres to the surface of the cycloolefin resin pellets.

19. The process of claim 15 wherein step (b) comprises dissolving the coating material in a volatile solvent, mixing

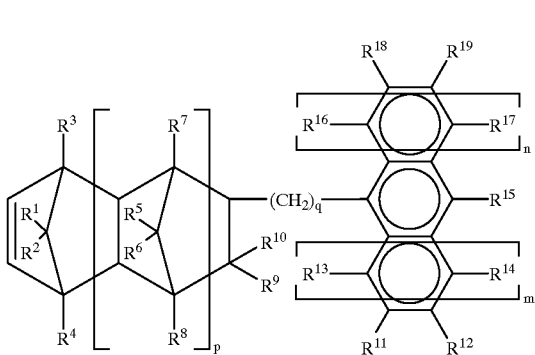

wherein each of p and q is, independently, 0 or an integer of 1 or more; each of m and n is, independently, 0, 1 or 2;

R$^{\prime 1}$ to R$^{\prime 19}$ are each, independently, a hydrogen atom, a halogen atom, an aliphatic hydrocarbon group, an alicyclic hydrocarbon group, an aromatic hydrocarbon group or an alkoxy group; the carbon atom to which R$^{\prime 9}$ and R$^{\prime 10}$ are linked may be bonded directly or by way of an alkylene group of 1 to 3 carbon atoms to the carbon atom to which R$^{\prime 13}$ is linked or the carbon atom to which R$^{\prime 11}$ is linked; and R$^{\prime 15}$ and R$^{\prime 12}$, or R$^{\prime 15}$ and R$^{\prime 19}$ may be linked to each other to form a monocyclic or polycyclic aromatic ring when each of m and n is 0.

15. A process for producing a molded product having excellent transparency and low haze value from cycloolefin resin pellets comprising the steps of:

(a) blending the cycloolefin resin in the form of powder or concentrated solution with antioxidant, stabilizer or filler, and forming cycloolefin resin pellets from the resulting blend;

(b) adhering onto the surface of cycloolefin resin pellet, a powdery coating material and/or a liquid coating material, said coating material being an organic material having a lubricating action or an antioxidant action, the melting point or the glass transition point of said coating material being 200° C. or lower;

(c) melting the pellet from step (b) and forming a molded product from the resulting melt;

wherein said cycloolefin resin is at least one cycloolefin resin selected from the group consisting of:

(A) a cycloolefin random copolymer of:
   (a) ethylene and
   (b) a cycloolefin represented by the following formula (I) or (II) and having a softening temperature (TMA) of 70° C. or higher;

(B) a ring-opening (co)polymer of a cycloolefin represented by the following formula (I) or (II) and having a softening temperature (TMA) of 70° C. or higher; and (C) a hydrogenation product of the ring-opening (co) polymer (B) and having a softening temperature (TMA) of 70° C. or higher;

the cycloolefin resin pellets with the resulting solution and volatilizing the solvent.

20. The process of claim 1 wherein step (b) comprises dissolving the coating material in a volatile solvent, mixing the cycloolefin resin pellets with the resulting solution and volatilizing the solvent.

\* \* \* \* \*